United States Patent [19]

Petruchik

[11] Patent Number: 5,587,752
[45] Date of Patent: Dec. 24, 1996

[54] CAMERA, SYSTEM AND METHOD FOR PRODUCING COMPOSITE PHOTOGRAPHIC IMAGE

[75] Inventor: Dwight J. Petruchik, Honeoye Falls, N.Y.

[73] Assignee: Eastman Kodak Company, Rochester, N.Y.

[21] Appl. No.: 462,330

[22] Filed: Jun. 5, 1995

[51] Int. Cl.⁶ .................... G03B 17/24; G03B 29/00; G03B 27/52
[52] U.S. Cl. .................... 396/315; 355/40; 355/41; 396/332
[58] Field of Search ................ 354/76, 105, 106, 354/110, 120, 75; 355/40, 41; 430/496

[56] References Cited

U.S. PATENT DOCUMENTS

| | | | |
|---|---|---|---|
| 4,800,406 | 1/1989 | Signoretto | 354/105 |
| 4,973,997 | 11/1990 | Harvey | 354/106 |
| 5,151,726 | 9/1992 | Iwashita et al. | 354/75 |
| 5,160,952 | 11/1992 | Iwashita et al. | 354/76 |
| 5,189,453 | 2/1993 | Boyd | 354/122 |
| 5,204,707 | 4/1993 | Harvey | 354/75 |
| 5,272,025 | 12/1993 | Wheeler | 354/76 |
| 5,343,265 | 8/1994 | Oi et al. | 354/288 |
| 5,343,386 | 8/1994 | Barber | 364/400 |
| 5,382,508 | 1/1995 | Ikenoue | 354/106 |
| 5,493,354 | 2/1996 | Watanabe et al. | 354/106 |

FOREIGN PATENT DOCUMENTS

0499742A1  8/1992  European Pat. Off. .
2218529    11/1989  United Kingdom .

Primary Examiner—A. A. Mathews
Attorney, Agent, or Firm—Roger A. Fields

[57] ABSTRACT

A photographic camera, system and method are presented for producing a composite image or print from an exposed film frame and a selected prerecorded image. The prerecorded image is selected by the photographer at the time of exposure of the film frame (14) from a known set of prerecorded images. A selected identifier (18) is imprinted, for example, optically or magnetically onto the film (10, 10') commensurate with exposure of a photographic image onto the film frame (14). The coding is employed in a subsequent automated scanning, integrating and printing operation (79) to produce the desired composite image.

30 Claims, 7 Drawing Sheets

CAMERA, SYSTEM AND METHOD FOR PRODUCING COMPOSITE PHOTOGRAPHIC IMAGE

TECHNICAL FIELD

The present invention relates generally to the production of a composite photographic image and, more particularly, to a film, camera apparatus, system and method for producing such a composite image from a captured photographic image and a selected prerecorded image.

BACKGROUND ART

Several approaches are known for producing a composite image composed of a photographic image and a prerecorded image. One approach is to expose a slide or transparency containing a prerecorded image directly onto a film negative within an exposure chamber of a camera commensurate with exposure of a photographic image onto a portion of a common film frame, with the balance of the film frame comprising the exposure resulting from the slide or transparency. Examples of this approach are provided in published European Patent Application document No. 0 499 742 A1 and published United Kingdom Patent Application document No. 2 218 529 A. Unfortunately, the approach has several drawbacks.

In particular, small transparencies or slides containing the prerecorded image must be manufactured, handled, stored and eventually inserted into the camera by the user prior to or at the time of capturing the photographic image. Further, since the prerecorded image exposes directly onto the film negative along with the photographic image, there is considerable difficulty in providing a sharp reproduction of the prerecorded image. Also, exposure balancing of the prerecorded image and the photographic image can be difficult since the two images are exposed separately onto the film but printed simultaneously by the photofinisher. Thus, the photofinisher has minimal leeway in compensating for an overexposed or underexposed image.

Another approach to producing a composite image is to preburn the prerecorded image onto the film negative in a selected area of a film frame. The selected area is then masked off while the photographic image is exposed onto the film frame about the masked area. For example, a banner might be pre-exposed along a lower portion of each film frame of a roll of film so that when the film is processed the photographic print contains the banner along a lower edge and the user captured photographic image in the balance of the print. Detailed examples of a method and system implementing this approach are provided in commonly assigned U.S. Pat. No. 5,189,453, entitled: "Method and System For Pre-Exposing Information on a Filmstrip." Although not requiring the handling of small slides, this approach inherently has certain of the other disadvantages outlined above in connection with the first approach.

Thus, there exists a need in the art for an improved method and apparatus for producing a composite photographic image, preferably from a user selected prerecorded image and a user captured photographic image. The concepts presented herein address this need.

SUMMARY OF THE INVENTION

This invention comprises in one aspect a system for producing a composite image comprising a photographic image and a selected prerecorded image. The selected prerecorded image is retrieved from a set containing a plurality of prerecorded images. This system includes a camera and an automated integrating system. The camera captures the photographic image on film and includes a select mechanism for the photographer to select and record an identifier on the film in association with the photographic image. The identifier identifies the selected prerecorded image from the set containing the plurality of prerecorded images. The automated integrating system includes a scanner, a retrieval mechanism, and a computer. The scanner scans the film with the photographic image and identifier recorded thereon and feeds to the retrieval mechanism a signal representative of the scanned identifier. The retrieval mechanism responds thereto by automatically retrieving the selected prerecorded image from the set containing the plurality of prerecorded images. The computer composes the composite image from the photographic image scanned by the scanner and the selected prerecorded image retrieved by the retrieval mechanism.

In another aspect, a photographic film is presented for use in producing a composite image from a photographic image and a selected prerecorded image. The selected prerecorded image is an image obtained from a selected set containing a plurality of prerecorded images. The set comprises one set of a plurality of available sets of images. Each set contains a unique plurality of prerecorded images. The photographic film comprises a photographic film roll having multiple film frames onto which a user may sequentially capture multiple photographic images. The roll is coded with a first identifier that identifies a selected set of the plurality of sets and contains multiple coding areas associated with the multiple film frames, such that one coding area corresponds to one film frame and such that when the photographic film roll is employed within a camera having a select mechanism to record an identifier on the photographic film, a user may capture a photographic image within a film frame and record a second identifier into the associated coding area. The second identifier identifies the selected prerecorded image from the set identified by the first identifier. When the photographic and prerecorded images are combined during subsequent processing, the composite image is produced.

In another aspect, a camera is provided for use in producing a composite image comprising a photographic image and a selected prerecorded image. The selected prerecorded image is from a set containing a plurality of prerecorded images. The camera comprises a means for holding and advancing photographic film, a shutter release mechanism, an objective lens with a field of view, and means, responsive to activation of the shutter release mechanism, for exposing a film frame of the photographic film through the lens to thereby capture the photographic image within the film frame. A select mechanism is also provided for imprinting a user defined identifier on the photographic film in association with the film frame. The identifier comprises a code which identifies from the set containing the plurality of prerecorded images, the selected prerecorded image to be integrated with the photographic image during subsequent processing.

In still another aspect, a method is presented for producing a composite image comprising a photographic image and a selected prerecorded image drawn from a set containing a plurality of prerecorded images. The method comprises the steps of capturing the photographic image on film; imprinting an identifier on the film in association with the photographic image, the identifier identifying the selected prerecorded image from the set containing the plurality of prerecorded images; thereafter, scanning the film to obtain therefrom the photographic image and the identifier imprinted thereon; automatically retrieving the selected prerecorded image from the set containing the plurality of prerecorded images using the obtained identifier; and automatically composing the composite image from the photographic image obtained during the scanning step and the preselected, prerecorded image retrieved during the automatically retrieving step.

To summarize, certain novel concepts are presented herein for digitally producing a composite photographic image from an exposed photographic film image and a selected prerecorded image chosen by the photographer at the time of exposure of the photographic image. With this approach, improved focus and exposure balance on a photographic printout of the composite image are obtained. Further, the approach presented herein provides a photographer with greater flexibility in designing a composite image. In certain embodiments, provision can be made for user selection of the set of prerecorded images among which to choose, as well as allowing the user to identify at time of film exposure particular prerecorded images within that selected set for integration with the captured photographic image. In addition, since the composite image described herein is digitally composed, the prerecorded image and the photographic image can be intertwined, which is not possible with prior approaches. Finally, a manufacturer can readily add or modify sets of prerecorded images because the actual images reside in files at a photofinisher. A manufacturer would only need to update the images with the photofinisher and provide appropriate packaging changes with the disposable-type camera or roll of film to be used in accordance with the present invention.

BRIEF DESCRIPTION OF THE DRAWINGS

These and other objects, advantages and features of the present invention will be more readily understood from the following detailed description of certain preferred embodiments of the invention, when considered in conjunction with the accompanying drawings in which.

DETAILED DESCRIPTION OF THE INVENTION

A photographic camera, system and method pursuant to this invention enable a composite image or print to be produced from an exposed film frame through user coding of the film frame at the time of exposure to identify from a known set of prerecorded images, a selected prerecorded image to be integrated with the exposed photographic image. The coding is employed in a subsequent scanning, integrating and printing operation to produce the desired composite image.

Figure 1:
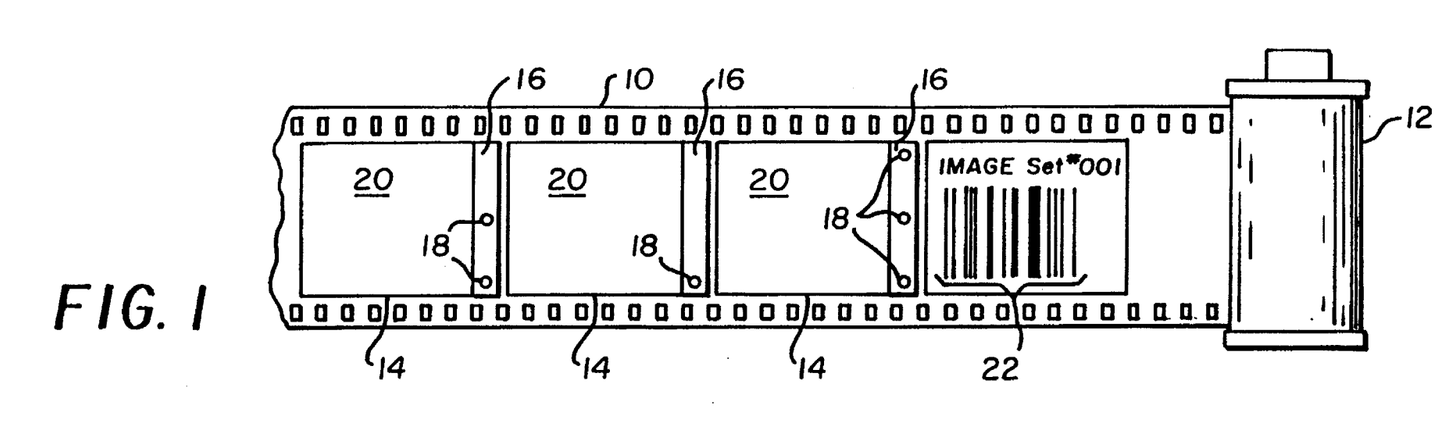
FIG. 1 is a partially unrolled photographic film cartridge in accordance with the present invention employing standard metering with a user imprinted selection code within each film frame and a manufacturer imprinted bar code to identify a particular set of prerecorded images referenced by the user imprinted selection code.
Figure 2:
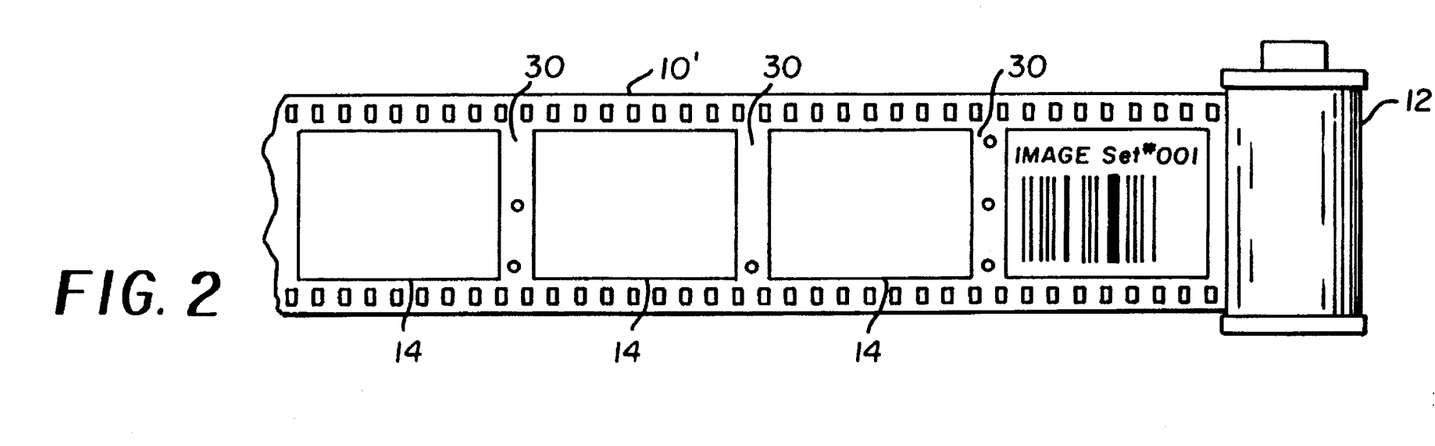
FIG. 2 is a partially unrolled photographic film cartridge in accordance with the present invention employing nine perforation metering and displaying user defined selection codes between each film frame and a manufacturer imprinted bar code to identify a particular set of prerecorded images referenced by the user imprinted selection code.

FIGS. 1 & 2 depict two different implementations of photographic film in accordance with the present invention. In FIG. 1, which partially depicts photographic film 10 unrolled from a photographic film cartridge 12, standard eight perforation metering per film frame 14 is used. A significant aspect of this invention is the ability of a camera user to code an identifier onto the film in association with each exposure, wherein the identifier is understood by the camera user to correspond to a selected prerecorded image to be subsequently integrated during photofinishing with the corresponding photographic image exposed onto the film. In this embodiment, a region 16 of each film frame 14 is masked to accommodate the user coded identifier, which by way of example, comprises one, two or three light exposed bits 18. With binary coding, a one of eight select would be possible using three bits. Upon exposure, the photographic image resides within region 20 of each film frame 14.

Those skilled in the art should note that optical coding is presented only as one example of a select (or coding) mechanism. An alternate embodiment would be to magnetically print a binary code on appropriate magnetic tape associated with the film exposures. The magnetic tape need not reside adjacent each film frame provided a correlation between each coded identifier and a respective film frame is maintained. Further alternatives would be to mechanically imprint the film or to electrically imprint the film via a memory device, e.g., disposed within the film cartridge or a single use camera within which the film resides.

This invention also contemplates the existence of multiple sets of prerecorded images. If provided, then film 10 may comprise a specialty roll of film having a prerecorded code, for example, bar code 22 imprinted thereon which identifies one set of the multiple sets of prerecorded images. Assuming that the set is precoded, then the photographer selects among the prerecorded images in this known set by coding identifiers onto the film as described herein. Each set of prerecorded images may be dedicated to a common theme, such as a religious holiday, a vacation destination, a business identity, etc. In packaging associated with a precoded roll of film, or a disposable-type camera containing the precoded roll of film, the plurality of prerecorded images among which the photographer can select would be displayed or otherwise defined.

As a further alternative, instead of the manufacturer imprinting a set code onto the film itself, an individual photographer might select a particular set of prerecorded images by affixing a chosen preprinted label to the photographic film cartridge 12, or single use camera, prior to photofinishing. The preprinted label would identify for the photofinisher the set of images to which the imprinted light bits 18 refer. Obviously, with this approach, multiple preprinted labels would be provided at point of purchase on packaging associated with the film cartridge or disposable camera. Other possibilities for selecting the set of images to which the bit coding applies are conceivable by one skilled in the art.

In FIG. 2, film 10' is shown partially unrolled from a photographic film canister 12'. This film comprises a photographic film roll having nine perforation metering that allows defining of regions 30 between film frames 14 for selected light bit indicators to be coded in association with and, most likely, simultaneously with exposure of a photographic image on a respective film frame. In the embodiment depicted, the indicators again comprise one, two, or three light exposed bits, which allow for a one of eight select using binary coding.

It should be understood from the different embodiments of FIGS. 1 & 2 that the location of the indicator coded onto the film in accordance with this invention is somewhat arbitrary. In the optical coding example, the indicator is preferably imprinted adjacent to the exposure along a horizontal border or a vertical border either internal or external to the film frame with which it is associated. In the embodiments discussed herein below, the indicator is optically imprinted onto the film simultaneous with exposure of a photographic image within the film frame. Use of a different encoding technique, such as magnetic, mechanical or electrical encoding, might require that the indicator reside remote from the film frame with which is associated.

As one packaging possibility, set coded film in accordance with the present invention may reside within a disposable-type camera. Various structures for imprinting light bit indicators which could be used in accordance with the present invention are possible. For example, two different camera systems which may be adapted for use with this invention are described in commonly assigned U.S. Pat. Nos. 4,973,997 and 5,204,707.

Figure 3:
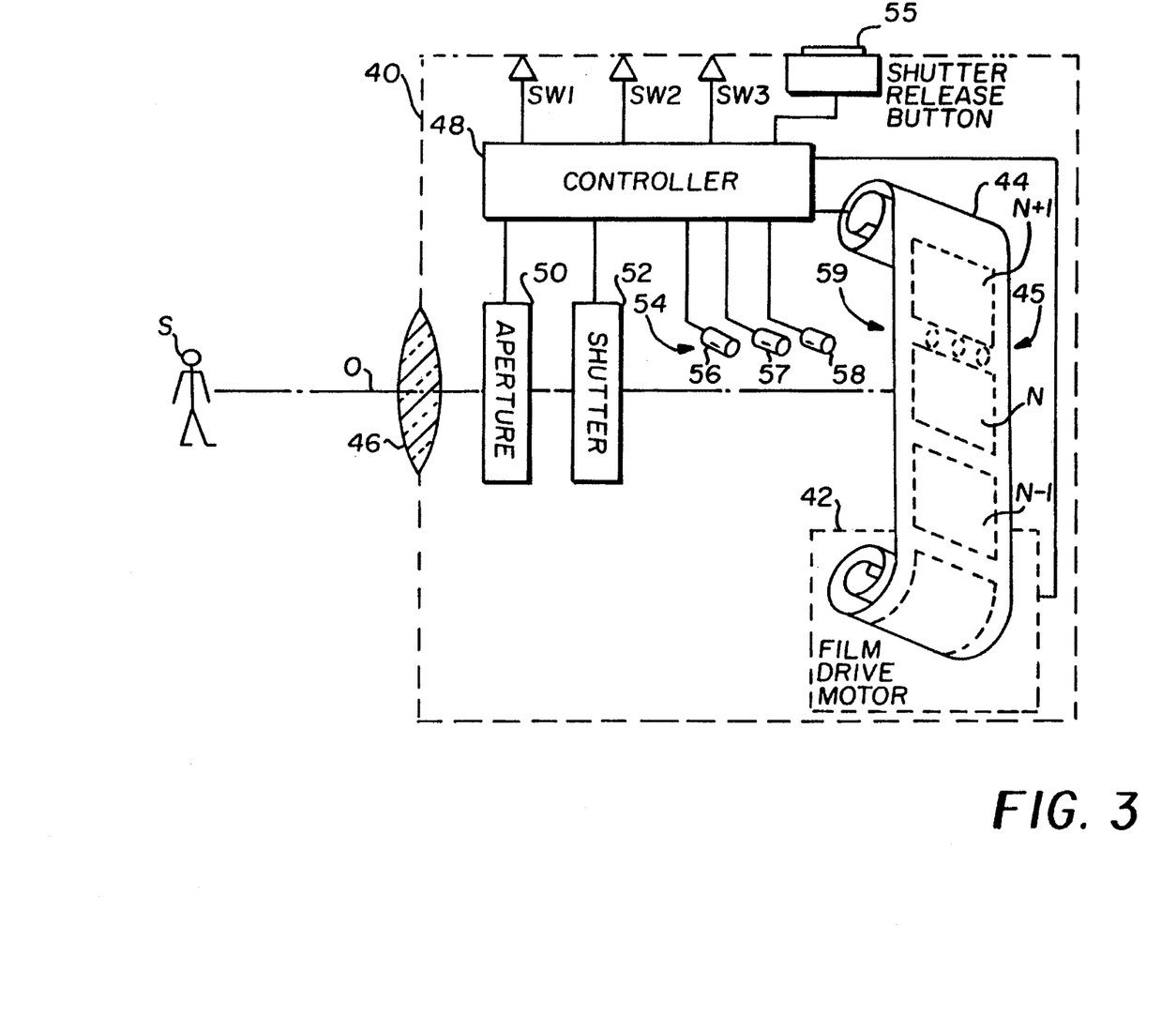
FIG. 3 is a block diagram showing the general features of a camera apparatus usable in accordance with the present invention.

FIG. 3 presents one embodiment of these camera systems wherein a camera 40 includes a film transport mechanism 42 for supporting and advancing a film strip 44 past an exposure station 45 within the body of camera 40. A lens 46, aperture mechanism 50 and shutter mechanism 52 are positioned along an optical 0 axis to control the exposure of film frames N–1, N, N+1 to provide undeveloped latent image scenes onto film strip 44. The lens 46 serves, for example, as shown to focus an image of a subject S onto a frame section N located at a portion of the film 44 supported in the focal plane of the lens 46 at the exposure station 45. The lens 46 may be a fixed lens, or may be a variable focal length zoom lens.

A controller 48, for example, a microprocessor, is connected to aperture mechanism 50 and shutter mechanism 52, and to film transport mechanism 42. Controller 48 is also coupled to and responsive to a shutter release button 55, operation of which causes the controller 48 to set aperture 50 and actuate shutter 52.

The camera 40 further includes a recording device 54 connected to controller 48 and positioned adjacent to film 44 so as to record data on the film. Recording device 54 may, for example, comprise three light emitting diodes (LEDs) 56, 57, 58 which are disposed in evenly-spaced relationship within camera 40 for selective energization to spot-expose various code fiducials in binary form onto film 44 at a location 59 adjacent to an exposed frame N, as indicated schematically in FIG. 3. Selective energization of LEDs 56, 57, 58 is controlled by controller 48 in response to the open or closed status of the respective switches SW1, SW2, SW3 as set by the user prior to depressing the release button 55 to initiate a frame exposure. The switches may be manually individually set to provide a light bit pattern corresponding to a desired prerecorded image of the known set of prerecorded images to which the film corresponds. The binary form of the resulting code fiducial exposed adjacent to the film frame N identifies the particular setting entered at the switches SW1–SW3.

Figure 4:
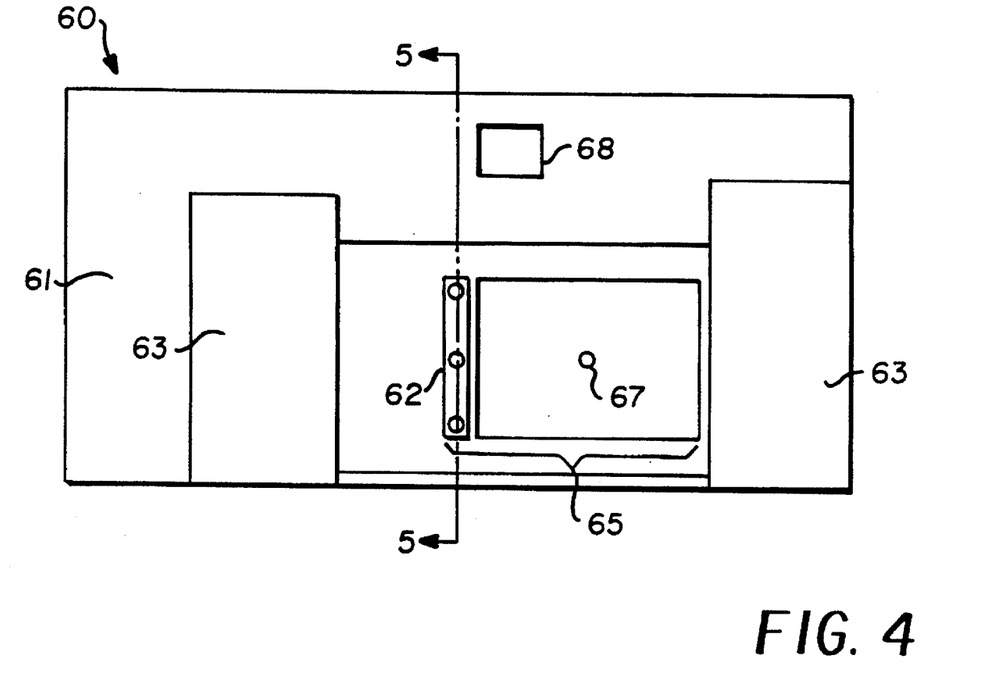
FIG. 4 is a back elevational view of an alternate embodiment of a camera apparatus usable pursuant to the present invention.

FIGS. 4–8 depict a camera 60 having an alternate embodiment of a recording device 62 for recording data onto the film. Unless otherwise stated, the internal mechanisms of camera 60 are assumed to be similar to those discussed above in connection with camera 40 (FIG. 3). FIG. 4 depicts camera 60 as having a camera body 61 with film housings and an appropriate drive mechanism 63 spaced on either side of an exposure station 65. Station 65 includes a main photographic image aperture 67 and three light bit indicator apertures 62 vertically aligned so as to imprint coding onto photographic film (not shown) transverse to the conventional direction of advancement of the film within the camera. Again, such a coding orientation is provided by way of example only. Also depicted in FIG. 4 is a view finder 68 used by a photographer to select the photographic image to be exposed onto the film.

Figure 5:
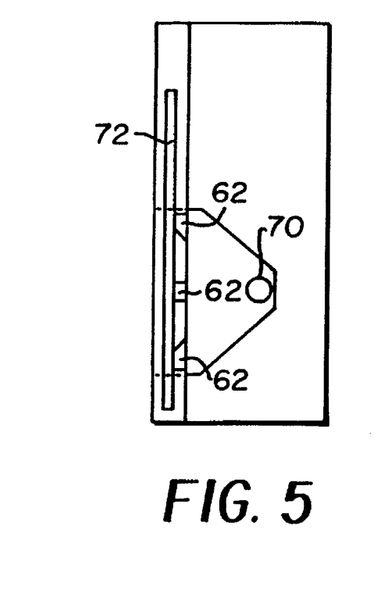
FIG. 5 is a cross-sectional view of the camera apparatus of FIG. 4 taken along lines 5—5.

FIG. 5 is a simplified cross-sectional view of the camera 60 of FIG. 4 taken along lines 5—5. In this embodiment, a single LED 70 is employed in association with the three exposure apertures 62. A slide mechanism 72 is disposed to reside between the exposure apertures and the photographic film (not shown) in the region of the exposure station. Operation of one implementation of slide mechanism 72 is discussed below with reference to the successive functional depictions of FIGS. 6–8.

Figure 6:
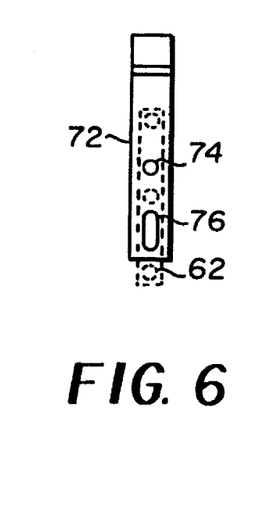
FIG. 6 is a functional view of a manually actuated light-blocking slide and exposure apertures for imprinting a first selection code onto the photographic film.

In FIG. 6, slide mechanism 72 is shown superimposed atop the three exposure apertures 62, which are shown in phantom. Slide mechanism 72 has two openings therein. A first opening 74 is an opening substantially identical in size and shape to each of the three exposure apertures 62. A second opening 76 comprises an oblong-shaped opening which selectively allows light to pass through the middle exposure aperture as described below. In the position depicted in FIG. 6, only the lowermost aperture of the three exposure apertures is unblocked to allow light from LED 70 (FIG. 5) to pass through to the photographic film.

Figure 7:
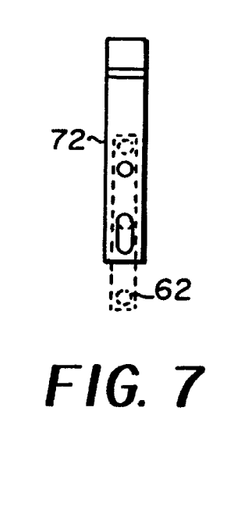
FIG. 7 is a functional view of the structure of FIG. 6 positioned to imprint a second selection code onto the photographic film.

In FIG. 7, slide mechanism 72 has been actuated upwards so that light is now allowed to pass through opening 76 and, thus, the two lowermost exposure apertures 62. Finally, in FIG. 8 slide mechanism 72 has been further actuated upwards such that light is allowed to pass through both openings 74 and 76, and therefore each of the three exposure apertures to imprint the photographic film.

Figure 8:
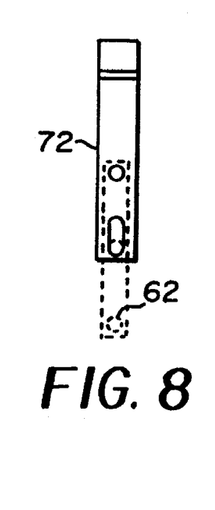
FIG. 8 is a functional view of the structure of FIG. 6 positioned to imprint a third selection code onto the photographic film.

Note that the recording mechanism depicted in FIGS. 6–8 allows for only a one of three select, i.e., either one, two or three light bit indicators to be exposed onto the photographic film. Slide mechanism 72 could be structured to be readily manually reset by the photographer prior to exposure of each film frame. Although more restrictive in that only one of three prerecorded images could be coded, the recording approach presented in FIGS. 4–8 would have a cost advantage over that of FIG. 3, which may be significant if implemented within a disposable-type, single use camera.

Figure 9:
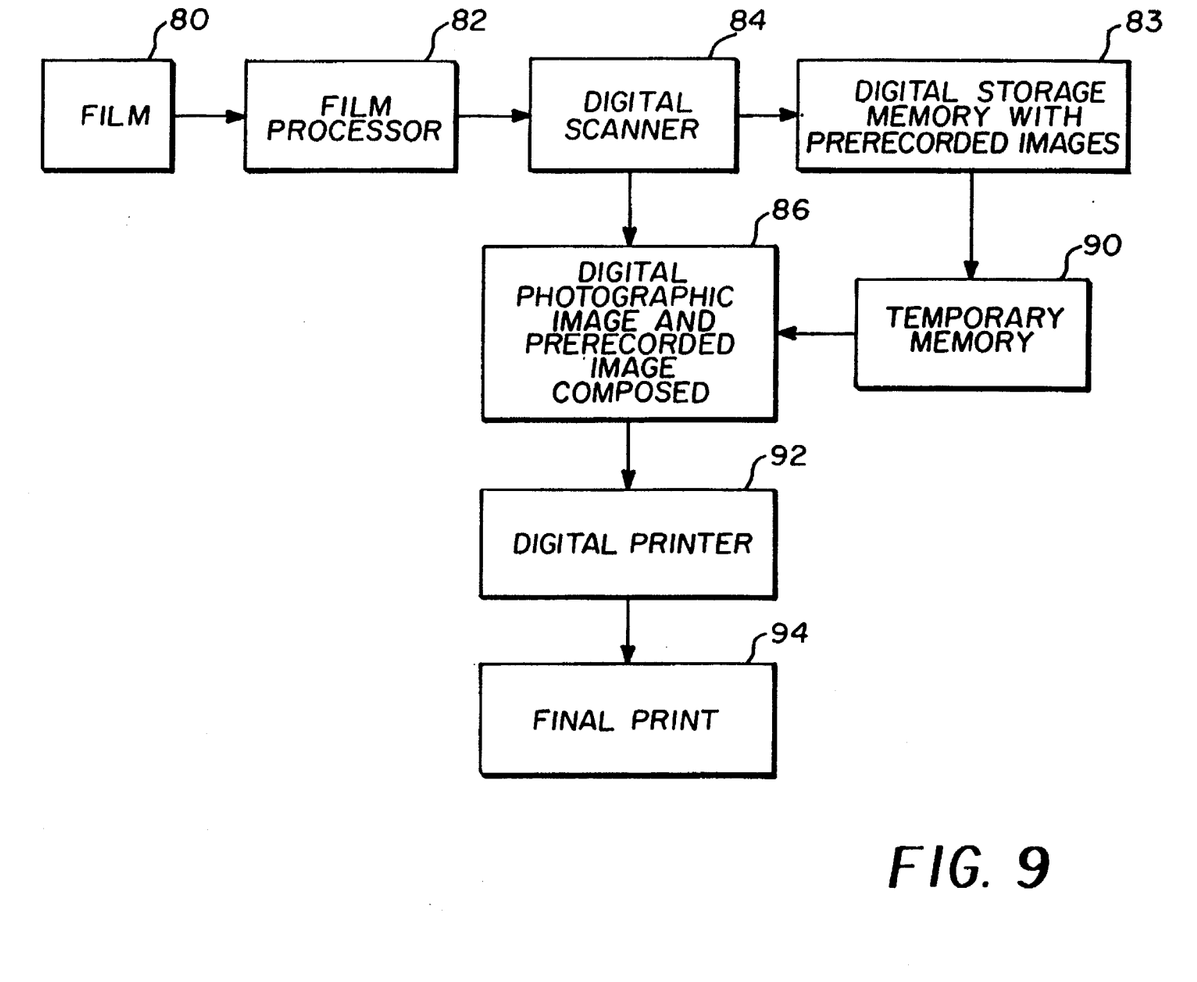
FIG. 9 is a block diagram showing the features of one embodiment of a photofinishing system implementing the present invention.

One embodiment of a subsequent photofinishing system 79 in accordance with the present invention is depicted in FIG. 9. Photographic film 80 is initially received at a conventional film processor 82 which takes the latent images from the negative and converts them into viewable images. From processor 82, the photographic images are fed to a digital scanner 84, such as the Kodak PCD Film Scanner 6000, marketed by the Eastman Kodak Company of Rochester, N.Y., which digitizes the photographic image and the associated identifier. The image is sent to a computer 86, such as a microprocessor with appropriate software, for integration with the selected prerecorded image, while the digitized identifier is transferred from scanner 84 to a main storage memory 88 containing the set of prerecorded images, for example, on hard disk or photo compact disks. The selected prerecorded image is retrieved and fed to temporary memory 90, such as random access memory, which is coupled for access by the computer 86.

Figure 10:
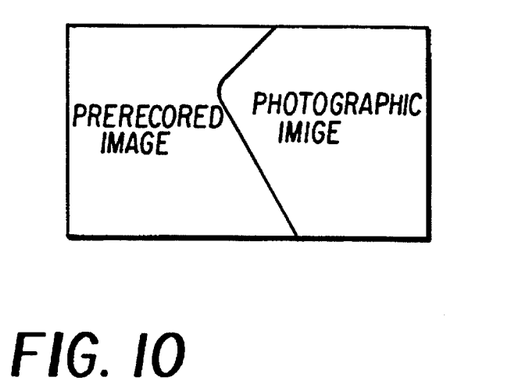
FIG. 10 depicts one example of a photographic print of a composite photographic image in accordance with the present invention.

Appropriate digital image manipulating software run by computer 86 is presently commercially available, however, software dedicated to the particular concepts presented herein can be readily written by one of ordinary skill in the art to accomplish any desired form of composition. Once composed, the composite image is preferably fed to a digital printer 92 which provides a final hard copy photographic print 94 comprising the composite image. Note that with the digital integrating manipulations discussed herein, any desired configuration of the prerecorded image and the photographic image within the composite image is possible. For example, FIG. 10 presents one embodiment wherein there is a curved line demarcation between the prerecorded and the photographic images. Alternate embodiments of the prerecorded image might comprise a border about the photographic image or the two images might be intertwined or overlaid, for example, as in the case of a prerecorded image of fireworks exploding into or within a photographic image.

Figure 11:
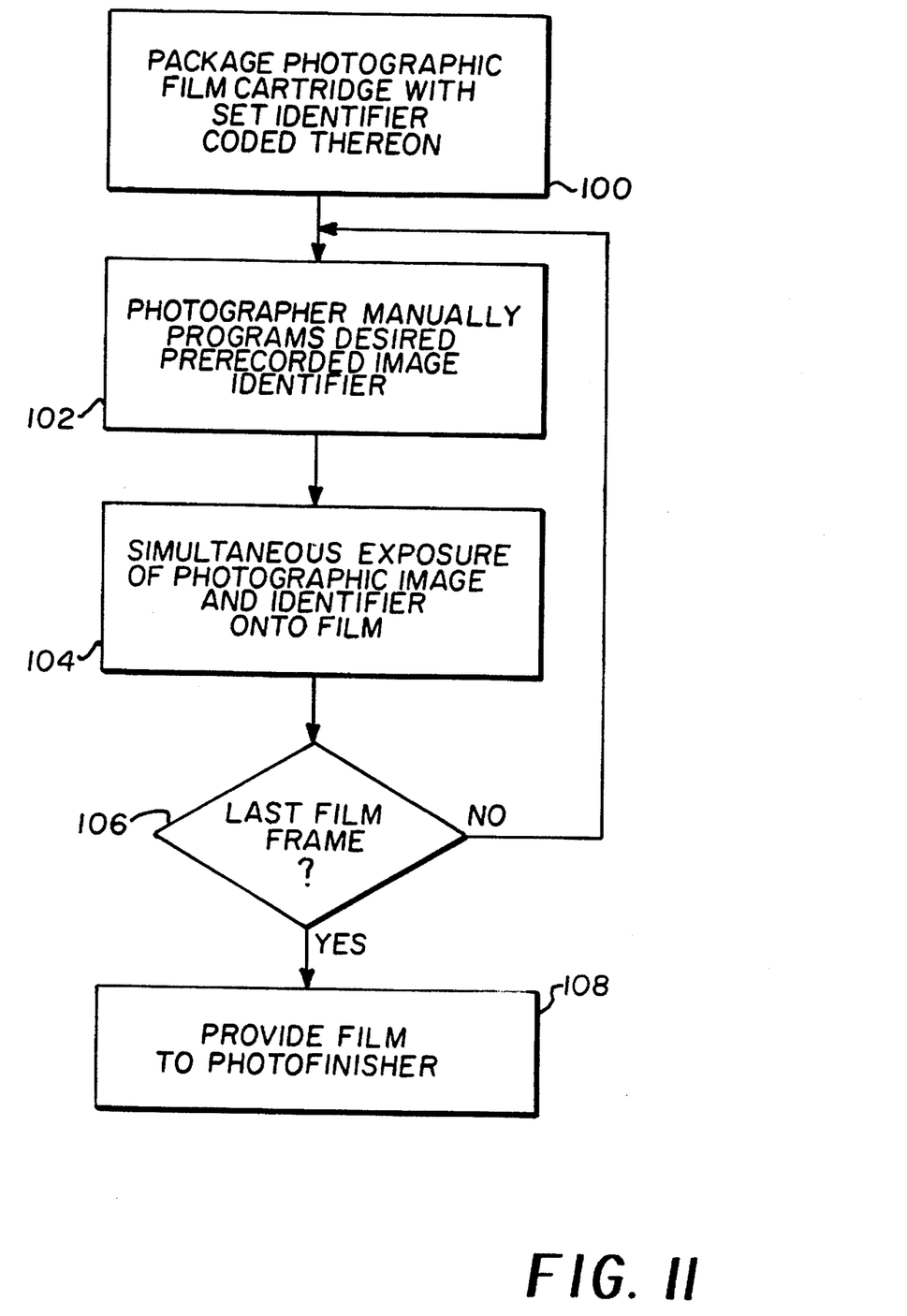
FIG. 11 is a functional overview of one method for exposing a photographic film roll in accordance with the present invention.
Figure 12:
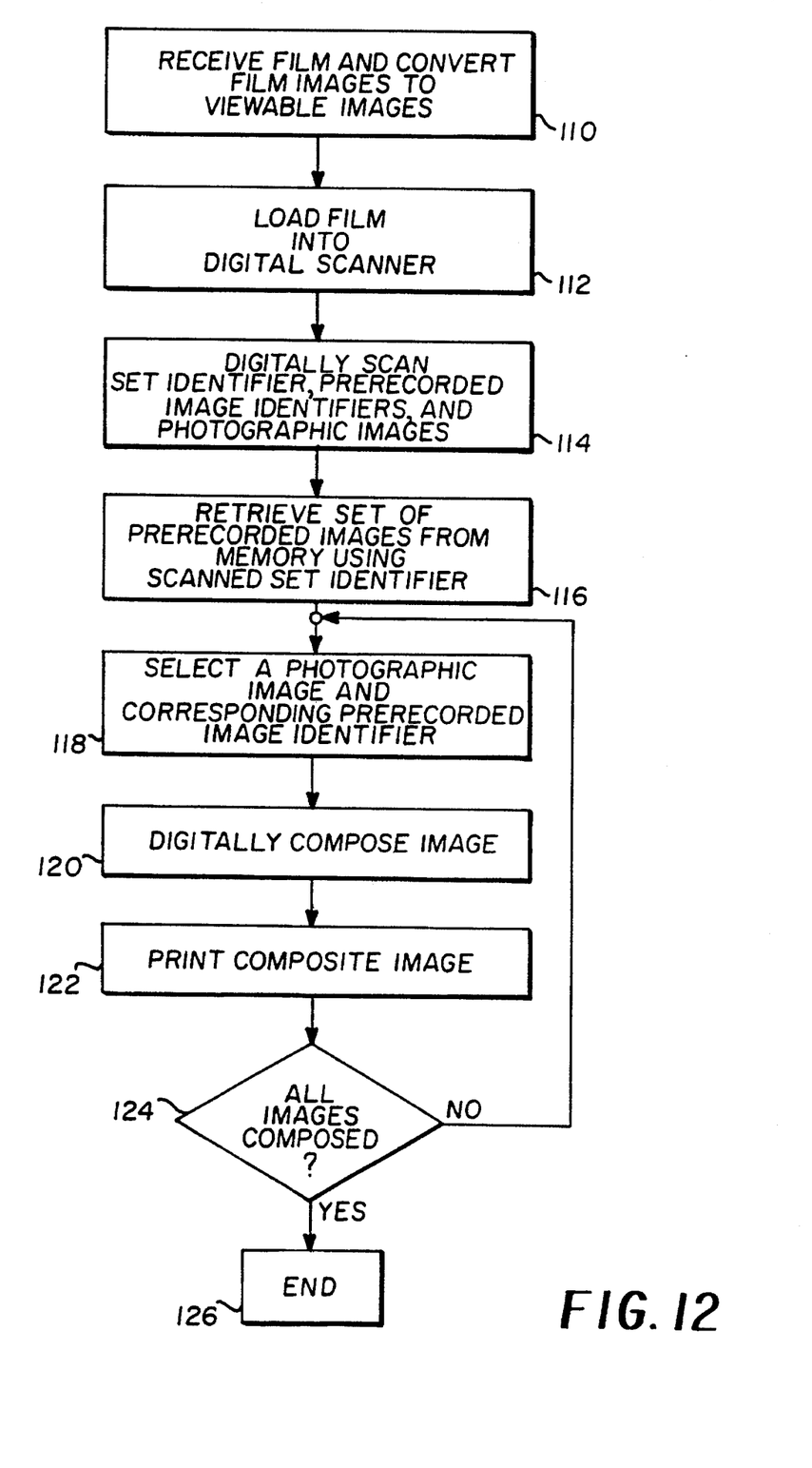
FIG. 12 is a functional overview of one method for photofinishing a film roll, exposed using the process of FIG. 11, for producing a composite photographic image in accordance with the present invention.

FIGS. 11 & 12 depict one process embodiment for producing a composite image in accordance with the present invention. Referring to FIG. 11, a manufacturer codes a set identifier onto a film cartridge or disposable-type camera containing a photographic film cartridge 100. Prior to exposing a photographic image onto the film roll, a photographer manually sets a select mechanism on the camera to imprint a desired second identifier 102, which is known to correspond to a desired prerecorded image. Assuming that the camera apparatus employs optical coding as described herein, then the camera is activated to simultaneously expose a photographic image onto a film frame within the exposure station and a selected identifier in association therewith 104. Preferably, this process repeats 106 until the last film frame is exposed on the roll of film. Thereafter, the roll of film or disposable-type camera is provided to a photofinisher 108.

Referring to FIG. 12, the photofinishing laboratory receives the film and converts the film images into viewable images 110. Thereafter, the viewable film images are loaded into a digital scanner 112, which digitally scans the precoded set identifier, the photographer programmed identifiers, and the photographic images exposed onto the film 114. The scanned set identifier is employed to automatically retrieve the corresponding set of prerecorded images from an associated memory storage 116. Thereafter, the computer controlling the photofinishing operation selects a first digitized photographic image and the corresponding prerecorded image referenced by the digitized identifier 118 and digitally composes a composite photographic image 120. If desired, this composite image can be outputted as a photographic print 122. The process repeats 124 until all images have been composed 126.

To summarize, certain novel concepts are presented herein for digitally producing a composite photographic image from an exposed photographic film image and a selected prerecorded image chosen by a photographer at the time of exposure of the photographic image. With this approach, improved focus and exposure balance of a photographic printout of the composite image are obtained. Further, the approach presented herein provides a photographer with greater flexibility in designing a composite image. In certain embodiments, provision can be made for user selection of a set of prerecorded images among which to choose, as well as allowing the user to identify at time of film exposure particular prerecorded images within that selected set for integration with the captured photographic image. In addition, since the composite image is digitally composed, the prerecorded image and the photographic image can be intertwined, which is not possible with prior approaches. Finally, a manufacturer can readily add or modify sets of prerecorded images because the actual images reside in files at a photofinisher. A manufacturer would only need to update the images with the photofinisher and provide appropriate packaging changes with the disposable camera or separate roll of film to be used by a photographer in accordance with the present invention.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

PARTS LIST FOR FIGS. 1–12

10, 10'- Photographic film
12, 12'- Film cartridge
14 - Film frame
16 - Masked region of film frame
18 - Light exposed bits
20 - Photographic image region of film frame
22 - Bar code
30 - Film region
40 - Camera
42 - Film transport mechanism
44 - Film strip
45 - Exposure station
46 - Lens
48 - Controller
50 - Aperture mechanism
52 - Shutter mechanism
54 - Recording device
55 - Shutter release button
56, 57, 58 - Light emitting diodes
59 - Film location for code fiducials
60 - Camera
61 - Camera body
62 - Recording device
63 - Film drive mechanism 65 - Exposure station
67 - Photographic image aperture
68 - View finder
70 - Light emitting diode
72 - Slide mechanism
74 - First opening in slide mechanism
76 - Second opening in slide mechanism
79 - Photofinishing system
80 - Photographic film
82 - Film processor
84 - Digital scanner
86 - Computer
88 - Main storage memory
90 - Temporary storage memory
92 - Digital printer
94 - Final composite print

I claim:

1. A system for producing a composite image comprising a photographic image and a selected prerecorded image, said selected prerecorded image being from a set containing a plurality of prerecorded images, said system comprising:

a camera for capturing said photographic image on film, said camera including a select mechanism to select and record an identifier on said film in association with said photographic image, said identifier identifying the selected prerecorded image from the set containing the plurality of prerecorded images; and an integrating system including
   a scanner to scan said film with said photographic image and said identifier recorded thereon,
   a retrieval mechanism responsive to said identifier scanned by said scanner to retrieve the selected prerecorded image from the set containing the plurality of prerecorded images, and
   a computer for composing said composite image from said photographic image scanned by said scanner and the selected prerecorded image retrieved by said retrieval mechanism.

2. The system of claim 1, wherein said automated integrating system includes computer memory, said set containing said plurality of prerecorded images being stored within said computer memory, and wherein said retrieval mechanism comprises a mechanism to retrieve the selected prerecorded image from said computer memory.

3. The system of claim 2, wherein said scanner comprises a digital film scanner which scans said film and digitizes said photographic image and said identifier recorded thereon to produce a digitized photographic image and a digitized identifier, the digitized identifier being employed by said retrieval mechanism to retrieve the selected prerecorded image from said computer memory.

4. The system of claim 3, wherein said integrating system further comprises a digital printer coupled to said computer, said digital printer outputting a photographic print of said composite image.

5. The system of claim 1, wherein said select mechanism of said camera includes means for imprinting coding onto a surface of said film within a masked region of a film frame to contain said photographic image, said imprinted coding comprising said identifier.

6. The system of claim 5, wherein said computer includes means for composing said composite image by integrating the photographic image and the selected prerecorded image such that the selected prerecorded image overlies a region of the composite image corresponding to the masked region of said film frame.

7. The system of claim 1, wherein said select mechanism comprises means for imprinting coding onto a surface of said film in an area outside a film frame to contain said photographic image, said area outside said film frame being adjacent to said film frame such that said imprinted coding is associated with said photographic image contained within said film frame, said imprinted coding comprising said identifier.

8. The system of claim 1, wherein said select mechanism includes a plurality of exposure apertures and means for selectively exposing light onto said film through at least one exposure aperture of the plurality of exposure apertures, said exposed light on said film comprising said identifier.

9. The system of claim 8, wherein said means for selectively exposing light includes a light source and a manually actuated, aperture blocking slide positioned over said plurality of exposure apertures between said light source and said film, wherein positioning of the manually actuated slide selects said at least one exposure aperture to pass light from said light source to said film thereby exposing said identifier onto said film.

10. The system of claim 1, wherein said set containing said plurality of prerecorded images comprises one set of a plurality of sets each of which contains a unique plurality of prerecorded images, and wherein said system further comprises said film, said film having an imprinted set code thereon to identify said one set of the plurality of sets, whereby the imprinted set code identifies said set and said identifier identifies the selected prerecorded image within that set to be employed in producing said composite image.

11. A photographic film for use in producing a composite image from a photographic image and a selected prerecorded image, said selected prerecorded image being a prerecorded image from a selected set containing a plurality of prerecorded images, said set comprising one set of a plurality of sets, each set containing a unique plurality of prerecorded images, said photographic film comprising a photographic film roll coded with a first identifier that identifies the selected set of the plurality of sets, said photographic film roll including multiple film frames within which a user may sequentially capture multiple photographic images, and multiple coding areas, each coding area being associated with one film frame of said multiple film frames such that when said photographic film roll is employed within a camera having a select mechanism to record an identifier on said photographic film, a user may capture a photographic image within a film frame and record a second identifier into the coding area associated with that film frame, said second identifier identifying the selected prerecorded image, from the set identified by said first identifier, to be combined with the photographic image during subsequent film processing to obtain said composite image, in combination with means permitting the user to select a prerecorded image from said selected set and determine a second identifier identifying the selected prerecorded image.

12. The combination of claim 11, wherein said first identifier comprises a bar code imprinted into said photographic film.

13. The combination of claim 11, wherein said first identifier comprises a label affixed to said photographic film roll.

14. The combination of claim 11, wherein said means permitting the user to select a prerecorded image comprises packaging which displays or otherwise defines the plurality of prerecorded images of said selected set to the user.

15. A camera for use in producing a composite image comprising a photographic image and a selected prerecorded image, the selected prerecorded image being from a set containing a plurality of prerecorded images, said camera comprising means for holding and advancing photographic film, a shutter release mechanism, an objective lens with a field of view, and means, responsive to activation of the shutter release mechanism, for exposing a film frame of said photographic film through the lens, thereby capturing the photographic image within said film frame, and a select mechanism for imprinting a user defined identifier on said photographic film or on media affixed to said photographic film such that said user defined identifier is associated with said film frame, said identifier comprising coding which identifies from the set containing the plurality of prerecorded images, the user selected prerecorded image to be integrated with the photographic image during subsequent film processing to obtain the composite image, in combination with means permitting the camera user to select a prerecorded image from said set and determine an identifier which identifies the user selected prerecorded image.

16. The combination of claim 15, wherein said set containing said plurality of prerecorded images comprises a selected set of a plurality of sets each containing a unique plurality of prerecorded images, and wherein said user defined identifier comprises a second identifier, and further comprising a first identifier affixed to one of said camera and said photographic film, said first identifier identifying said selected set from which said second identifier identifies the selected prerecorded image to be combined with the photographic image during subsequent film processing to obtain the composite image.

17. The combination of claim 16, wherein said first identifier comprises one of a bar code imprinted on said photographic film, a magnetic recording label affixed to said photographic film, and a label affixed to said camera.

18. The combination of claim 15, wherein said camera comprises a camera adapted for single use.

19. The combination of claim 15, wherein said select mechanism imprints said user defined identifier within a masked portion of said film frame.

20. The combination claim 15, wherein said select mechanism imprints said user defined identifier simultaneous with capturing of said photographic image within the film frame.

21. The combination of claim 20, wherein said select mechanism includes a manually actuated means for selecting the identifier to be imprinted onto said photographic film.

22. The combination of claim 20, wherein said select mechanism comprises an optical coding mechanism for optically imprinting the identifier onto said photographic film.

23. The combination of claim 15, wherein said means permitting the user to select a prerecorded image from said set comprises packaging which displays or otherwise defines the plurality of prerecorded images of said set to the user.

24. A method for producing a composite image comprising a photographic image and a selected prerecorded image, the selected prerecorded image being from a set containing a plurality of prerecorded images, said method comprising the steps of:

(a) capturing the photographic image on film;

(b) imprinting an identifier on the film in association with the photographic image, the identifier identifying the selected prerecorded image from the set containing the plurality of prerecorded images;

(c) subsequent to said steps (a) & (b), scanning the film to obtain therefrom the photographic image and the identifier imprinted thereon;

(d) retrieving the selected prerecorded image from the set containing the plurality of prerecorded images using the identifier obtained during said scanning step (c); and (e) composing the composite image from the photographic image obtained during said scanning step (c) and the selected prerecorded image retrieved during said automatically retrieving step (d).

25. The method of claim 24, wherein said method comprises accomplishing said steps (a) & (b) using a camera and accomplishing said steps (c)–(e) employing an integrating system separate from said camera.

26. The method of claim 25, further comprising performing said steps (a) & (b) simultaneously.

27. The method of claim 24, further comprising processing said film prior to said scanning step (c) to obtain a viewable image of said photographic image.

28. The method of claim 27, wherein said scanning step (c) comprises digitally scanning the film to obtain therefrom a digitized photographic image and a digitized identifier, and wherein said step (d) includes employing said digitized identifier and said step (e) includes employing said digitized photographic image.

29. The method of claim 24, wherein said set containing the plurality of prerecorded images comprises a selected set from a plurality of sets each containing a unique plurality of prerecorded images, said film containing a precoded set identifier, and wherein said method further comprises scanning said precoded set identifier to identify the selected set containing the plurality of prerecorded images from which the selected prerecorded image is identified.

30. An integrating system for producing a composite image comprising a photographic image and a selected prerecorded image, said selected prerecorded image being from a set containing a plurality of prerecorded images, said photographic image being captured on film along with an associated identifier, the identifier identifying the selected prerecorded image from the set containing the plurality of prerecorded images, said integrating system comprising:

a scanner to scan said film with said photographic image and said identifier recorded thereon, a retrieval mechanism responsive to said identifier scanned by said scanner to retrieve the selected prerecorded image from the set containing the plurality of prerecorded images, and a computer for composing said composite image from said photographic image scanned by said scanner and the selected prerecorded image retrieved by said retrieval mechanism.

* * * * *